US012192122B2

(12) United States Patent
Aibester et al.

(10) Patent No.: US 12,192,122 B2
(45) Date of Patent: Jan. 7, 2025

(54) ALLOCATION OF SHARED RESERVE MEMORY

(71) Applicant: MELLANOX TECHNOLOGIES, LTD., Yokneam (IL)

(72) Inventors: Niv Aibester, Herzliya (IL); Barak Gafni, Sunnyvale, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/581,423

(22) Filed: Feb. 20, 2024

(65) Prior Publication Data

US 2024/0195754 A1  Jun. 13, 2024

Related U.S. Application Data

(63) Continuation of application No. 17/588,385, filed on Jan. 31, 2022, now Pat. No. 11,973,696.

(51) Int. Cl.
*H04L 49/103* (2022.01)
*H04L 45/122* (2022.01)
(Continued)

(52) U.S. Cl.
CPC .......... *H04L 49/103* (2013.01); *H04L 45/122* (2013.01); *H04L 47/30* (2013.01); *H04L 49/9005* (2013.01); *H04L 49/9047* (2013.01)

(58) Field of Classification Search
CPC ..... H04L 49/103; H04L 45/122; H04L 47/30; H04L 49/9005; H04L 49/9047; H04L 47/50; H04L 67/568; H04L 49/90
See application file for complete search history.

(56) References Cited

U.S. PATENT DOCUMENTS

| 5,014,265 A | 5/1991 | Hahne et al. |
| 5,235,642 A | 10/1993 | Wobber et al. |

(Continued)

FOREIGN PATENT DOCUMENTS

| CN | 1379569 A | 11/2002 |
| EP | 0706298 A2 | 4/1996 |

(Continued)

OTHER PUBLICATIONS

U.S. Appl. No. 17/902,936 Office Action dated May 16, 2024.
(Continued)

*Primary Examiner* — Mounir Moutaouakil
(74) *Attorney, Agent, or Firm* — MEITAR PATENTS LTD.

(57) ABSTRACT

A device includes ports, a packet processor, and a memory management circuit. The ports communicate packets over a network. The packet processor processes the packets using queues. The memory management circuit maintains a shared buffer in a memory and adaptively allocates memory resources from the shared buffer to the queues, maintains in the memory, in addition to the shared buffer, a shared-reserve memory pool for use by the queues, identifies, among the queues, a queue that requires additional memory resources, the queue having an occupancy that is (i) above a current value of a dynamic threshold, rendering the queue ineligible for additional allocation from the shared buffer, and (ii) no more than a defined margin above the current value of the dynamic threshold, rendering the queue eligible for allocation from the shared-reserve memory pool, and allocates memory resources to the identified queue from the shared-reserve memory pool.

14 Claims, 3 Drawing Sheets

(51) Int. Cl.
*H04L 47/30* (2022.01)
*H04L 49/9005* (2022.01)
*H04L 49/9047* (2022.01)

(56) References Cited

U.S. PATENT DOCUMENTS

| | | |
|---|---|---|
| 5,367,520 A | 11/1994 | Cordell |
| 5,541,912 A | 7/1996 | Choudhury et al. |
| 5,574,885 A | 11/1996 | Denzel et al. |
| 5,790,522 A | 8/1998 | Fichou et al. |
| 5,917,947 A | 6/1999 | Ishida et al. |
| 6,108,713 A | 8/2000 | Sambamurthy et al. |
| 6,154,446 A | 11/2000 | Kadambi et al. |
| 6,160,814 A | 12/2000 | Ren et al. |
| 6,169,748 B1 | 1/2001 | Barbas et al. |
| 6,178,448 B1 | 1/2001 | Gray et al. |
| 6,219,728 B1 | 4/2001 | Yin |
| 6,324,165 B1 | 11/2001 | Fan et al. |
| 6,347,337 B1 | 2/2002 | Shah et al. |
| 6,456,590 B1 | 11/2002 | Ren et al. |
| 6,490,248 B1 | 12/2002 | Shimojo |
| 6,535,963 B1 | 3/2003 | Rivers |
| 6,539,024 B1 | 3/2003 | Janoska et al. |
| 6,594,263 B1 | 7/2003 | Martinsson et al. |
| 6,606,666 B1 | 8/2003 | Bell et al. |
| 6,633,395 B1 | 10/2003 | Tuchitoi et al. |
| 6,657,955 B1 | 12/2003 | Bonneau et al. |
| 6,678,277 B1 | 1/2004 | Wils et al. |
| 6,687,254 B1 | 2/2004 | Ho et al. |
| 6,771,654 B1 | 8/2004 | Sang et al. |
| 6,859,435 B1 | 2/2005 | Lee et al. |
| 6,895,015 B1 | 5/2005 | Chiang et al. |
| 6,922,408 B2 | 7/2005 | Bloch et al. |
| 6,973,555 B2 | 12/2005 | Fujiwara et al. |
| 6,993,032 B1 | 1/2006 | Dammann et al. |
| 7,027,457 B1 | 4/2006 | Chiussi et al. |
| 7,068,822 B2 | 6/2006 | Scott |
| 7,088,713 B2 | 8/2006 | Battle et al. |
| 7,131,125 B2 | 10/2006 | Modelski et al. |
| 7,136,381 B2 | 11/2006 | Battle et al. |
| 7,190,667 B2 | 3/2007 | Susnow et al. |
| 7,215,641 B1 | 5/2007 | Bechtolsheim et al. |
| 7,321,553 B2 | 1/2008 | Prasad et al. |
| 7,324,442 B1 | 1/2008 | Pan et al. |
| 7,327,749 B1 | 2/2008 | Mott |
| 7,330,426 B2 | 2/2008 | Berzosa et al. |
| 7,334,065 B1 | 2/2008 | Rose et al. |
| 7,346,059 B1 | 3/2008 | Garner et al. |
| 7,529,245 B1 | 5/2009 | Muller et al. |
| 7,590,058 B1 | 9/2009 | Cherchali et al. |
| 7,609,636 B1 | 10/2009 | Mott |
| 7,630,306 B2 | 12/2009 | Chuang |
| 7,680,139 B1 | 3/2010 | Jones et al. |
| 7,738,454 B1 | 6/2010 | Panwar et al. |
| 7,747,086 B1 | 6/2010 | Hobbs et al. |
| 7,773,621 B2 | 8/2010 | Jensen |
| 7,773,622 B2 | 8/2010 | Schmidt et al. |
| 7,778,168 B1 | 8/2010 | Rodgers et al. |
| 7,813,348 B1 | 10/2010 | Gupta et al. |
| 7,821,939 B2 | 10/2010 | DeCusatis et al. |
| 7,835,380 B1 | 11/2010 | Aloni et al. |
| 7,853,738 B2 | 12/2010 | Pothireddy et al. |
| 7,856,026 B1 | 12/2010 | Finan et al. |
| 7,872,973 B2 | 1/2011 | Sterne et al. |
| 7,894,343 B2 | 2/2011 | Chao et al. |
| 7,924,708 B2 | 4/2011 | Spink |
| 7,936,770 B1 | 5/2011 | Frattura et al. |
| 8,060,644 B1 | 11/2011 | Michailidis et al. |
| 8,078,743 B2 | 12/2011 | Sharp et al. |
| 8,125,902 B2 | 2/2012 | Rochon et al. |
| 8,149,710 B2 | 4/2012 | Bergamasco et al. |
| 8,270,295 B2 | 9/2012 | Kendall et al. |
| 8,274,971 B2 | 9/2012 | Battle et al. |
| 8,345,548 B2 | 1/2013 | Gusat et al. |
| 8,352,648 B1 | 1/2013 | Puranik |
| 8,473,693 B1 | 6/2013 | Muppalaneni et al. |
| 8,478,811 B2 | 7/2013 | Garg et al. |
| 8,565,092 B2 | 10/2013 | Arumilli et al. |
| 8,576,715 B2 | 11/2013 | Bloch et al. |
| 8,589,587 B1 | 11/2013 | Michailidis et al. |
| 8,599,868 B2 | 12/2013 | Sindhu et al. |
| 8,630,294 B1 | 1/2014 | Keen et al. |
| 8,635,386 B2 | 1/2014 | Takahashi |
| 8,656,188 B2 | 2/2014 | Goodwill et al. |
| 8,699,491 B2 | 4/2014 | Koren et al. |
| 8,705,349 B2 | 4/2014 | Bloch et al. |
| 8,730,982 B2 | 5/2014 | Wu et al. |
| 8,738,860 B1 | 5/2014 | Griffin et al. |
| 8,762,595 B1 | 6/2014 | Muller et al. |
| 8,767,561 B2 | 7/2014 | Gnanasekaran et al. |
| 8,811,183 B1 | 8/2014 | Anand et al. |
| 8,838,882 B1 | 9/2014 | Quong |
| 8,879,396 B2 | 11/2014 | Guay et al. |
| 8,923,337 B2 | 12/2014 | Singh |
| 8,989,017 B2 | 2/2015 | Naouri et al. |
| 8,995,265 B2 | 3/2015 | Basso et al. |
| 9,013,999 B1 | 4/2015 | Kondapalli |
| 9,014,006 B2 | 4/2015 | Haramaty et al. |
| 9,130,885 B1 | 9/2015 | Bukspan et al. |
| 9,210,095 B2 | 12/2015 | Basso et al. |
| 9,325,619 B2 | 4/2016 | Guay et al. |
| 9,325,641 B2 | 4/2016 | Haramaty et al. |
| 9,356,868 B2 | 5/2016 | Tabatabaee et al. |
| 9,426,085 B1 | 8/2016 | Anand et al. |
| 9,497,125 B2 | 11/2016 | Raindel et al. |
| 9,563,361 B1 | 2/2017 | Asiot et al. |
| 9,584,429 B2 | 2/2017 | Haramaty et al. |
| 9,648,148 B2 | 5/2017 | Rimmer et al. |
| 9,699,095 B2 | 7/2017 | Elias et al. |
| 9,742,683 B1 | 8/2017 | Vanini |
| 9,742,702 B1 | 8/2017 | Bukspan et al. |
| 9,762,491 B2 | 9/2017 | Gafni et al. |
| 9,807,024 B2 | 10/2017 | Shpiner et al. |
| 10,050,896 B2 | 8/2018 | Yang et al. |
| 10,069,701 B2 | 9/2018 | Elias et al. |
| 10,069,748 B2 | 9/2018 | Shpiner et al. |
| 10,084,716 B2 | 9/2018 | Gafni |
| 10,205,683 B2 | 2/2019 | Elias et al. |
| 10,237,376 B2 | 3/2019 | Crupnicoff et al. |
| 10,250,530 B2 | 4/2019 | Aibester et al. |
| 10,387,074 B2 | 8/2019 | Kriss et al. |
| 10,530,846 B2 | 1/2020 | Jung |
| 10,728,156 B2 | 7/2020 | Kwan et al. |
| 10,778,568 B2 | 9/2020 | Levy et al. |
| 10,951,549 B2 | 3/2021 | Elias et al. |
| 10,999,221 B2 | 5/2021 | Gafni et al. |
| 11,099,891 B2 | 8/2021 | Baldocchi et al. |
| 11,218,413 B2 | 1/2022 | Shpigelman et al. |
| 11,296,988 B2 | 4/2022 | Shpigelman et al. |
| 11,470,010 B2 | 10/2022 | Mula et al. |
| 11,558,310 B2 | 1/2023 | Kadosh et al. |
| 11,563,695 B2 | 1/2023 | Mitulal et al. |
| 11,962,638 B2 | 4/2024 | Spitulski |
| 11,973,696 B2 | 4/2024 | Aibester et al. |
| 2002/0012340 A1 | 1/2002 | Kalkunte et al. |
| 2002/0019916 A1 | 2/2002 | Henrion |
| 2002/0027908 A1 | 3/2002 | Kalkunte et al. |
| 2002/0039350 A1 | 4/2002 | Wang et al. |
| 2002/0067695 A1 | 6/2002 | Skarpness et al. |
| 2002/0087723 A1 | 7/2002 | Williams et al. |
| 2002/0176430 A1 | 11/2002 | Sangha et al. |
| 2002/0176432 A1 | 11/2002 | Courtney et al. |
| 2002/0191559 A1 | 12/2002 | Chen et al. |
| 2003/0016628 A1 | 1/2003 | Kadambi et al. |
| 2003/0016697 A1 | 1/2003 | Jordan |
| 2003/0043828 A1 | 3/2003 | Wang et al. |
| 2003/0048792 A1 | 3/2003 | Xu et al. |
| 2003/0065812 A1 | 4/2003 | Beier et al. |
| 2003/0076849 A1 | 4/2003 | Morgan et al. |
| 2003/0095560 A1 | 5/2003 | Arita et al. |
| 2003/0108010 A1 | 6/2003 | Kim et al. |
| 2003/0112817 A1 | 6/2003 | Woo et al. |
| 2003/0117958 A1 | 6/2003 | Nation et al. |
| 2003/0118016 A1 | 6/2003 | Kalkunte et al. |

(56) References Cited

U.S. PATENT DOCUMENTS

| | | |
|---|---|---|
| 2003/0120894 A1 | 6/2003 | Wang et al. |
| 2003/0123392 A1 | 7/2003 | Ruutu et al. |
| 2003/0137939 A1 | 7/2003 | Dunning et al. |
| 2003/0179765 A1 | 9/2003 | Goetzinger et al. |
| 2003/0198231 A1 | 10/2003 | Kalkunte et al. |
| 2003/0198241 A1 | 10/2003 | Putcha et al. |
| 2003/0200330 A1 | 10/2003 | Oelke et al. |
| 2003/0217184 A1 | 11/2003 | Nair |
| 2003/0222860 A1 | 12/2003 | Yamaura |
| 2003/0223368 A1 | 12/2003 | Allen et al. |
| 2003/0223435 A1 | 12/2003 | Gil |
| 2004/0008714 A1 | 1/2004 | Jones |
| 2004/0027989 A1 | 2/2004 | Martin et al. |
| 2004/0037558 A1 | 2/2004 | Beshasi |
| 2004/0066785 A1 | 4/2004 | He et al. |
| 2004/0081090 A1 | 4/2004 | Hara et al. |
| 2004/0202169 A1 | 10/2004 | Mukouyama et al. |
| 2005/0053077 A1 | 3/2005 | Blanc et al. |
| 2005/0063370 A1 | 3/2005 | Beshai et al. |
| 2005/0076138 A1 | 4/2005 | Sterne |
| 2005/0094643 A1 | 5/2005 | Wang et al. |
| 2005/0125424 A1 | 6/2005 | Herriott et al. |
| 2005/0129033 A1 | 6/2005 | Gordy et al. |
| 2005/0135356 A1 | 6/2005 | Muthukrishnan et al. |
| 2005/0169172 A1 | 8/2005 | Wang et al. |
| 2005/0204103 A1 | 9/2005 | Dennison |
| 2005/0216822 A1 | 9/2005 | Kyusojin et al. |
| 2005/0223139 A1 | 10/2005 | Wagh et al. |
| 2005/0226156 A1 | 10/2005 | Keating et al. |
| 2005/0228900 A1 | 10/2005 | Stuart et al. |
| 2005/0259574 A1 | 11/2005 | Figueira et al. |
| 2006/0008803 A1 | 1/2006 | Brunner et al. |
| 2006/0034172 A1 | 2/2006 | Morton |
| 2006/0087989 A1 | 4/2006 | Gai et al. |
| 2006/0088036 A1 | 4/2006 | De Prezzo |
| 2006/0092837 A1 | 5/2006 | Kwan et al. |
| 2006/0092842 A1 | 5/2006 | Beukema et al. |
| 2006/0092845 A1 | 5/2006 | Kwan et al. |
| 2006/0095609 A1 | 5/2006 | Radhakrishnan et al. |
| 2006/0155938 A1 | 7/2006 | Cummings et al. |
| 2006/0182112 A1 | 8/2006 | Battle et al. |
| 2006/0251109 A1 | 11/2006 | Muller et al. |
| 2007/0015525 A1 | 1/2007 | Beming et al. |
| 2007/0019553 A1 | 1/2007 | Sagfors et al. |
| 2007/0025242 A1 | 2/2007 | Tsang |
| 2007/0041385 A1 | 2/2007 | Sali et al. |
| 2007/0053350 A1 | 3/2007 | Spink et al. |
| 2007/0097257 A1 | 5/2007 | El-Maleh et al. |
| 2007/0104102 A1 | 5/2007 | Opsasnick |
| 2007/0104211 A1 | 5/2007 | Opsasnick |
| 2007/0147292 A1 | 6/2007 | Van Ewijk et al. |
| 2007/0201499 A1 | 8/2007 | Kapoor et al. |
| 2007/0274215 A1 | 11/2007 | Gusat et al. |
| 2007/0291644 A1 | 12/2007 | Roberts et al. |
| 2007/0297453 A1 | 12/2007 | Niinomi |
| 2008/0037420 A1 | 2/2008 | Tang et al. |
| 2008/0114893 A1 | 5/2008 | Youn et al. |
| 2008/0144670 A1 | 6/2008 | Goossens et al. |
| 2008/0175146 A1 | 7/2008 | Van Leekwuck et al. |
| 2008/0192764 A1 | 8/2008 | Arefi et al. |
| 2008/0259936 A1 | 10/2008 | Hussain et al. |
| 2009/0003212 A1 | 1/2009 | Kwan et al. |
| 2009/0010162 A1 | 1/2009 | Bergamasco et al. |
| 2009/0073881 A1 | 3/2009 | Cui |
| 2009/0122702 A1 | 5/2009 | Chew et al. |
| 2009/0161684 A1 | 6/2009 | Voruganti et al. |
| 2009/0178140 A1 | 7/2009 | Cao et al. |
| 2009/0182944 A1 | 7/2009 | Comparan et al. |
| 2009/0207848 A1 | 8/2009 | Kwan et al. |
| 2010/0057953 A1 | 3/2010 | Kim et al. |
| 2010/0061238 A1 | 3/2010 | Godbole et al. |
| 2010/0061390 A1 | 3/2010 | Godbole et al. |
| 2010/0067539 A1 | 3/2010 | Lin et al. |
| 2010/0088756 A1 | 4/2010 | Balakrishnan et al. |
| 2010/0100670 A1 | 4/2010 | Jeddeloh |
| 2010/0165842 A1 | 7/2010 | Wang et al. |
| 2010/0220742 A1 | 9/2010 | Brewer et al. |
| 2010/0322076 A1 | 12/2010 | Goel |
| 2010/0325318 A1 | 12/2010 | Desoli et al. |
| 2011/0058571 A1 | 3/2011 | Bloch et al. |
| 2011/0286468 A1 | 11/2011 | Tomonaga et al. |
| 2012/0072635 A1 | 3/2012 | Yoshida et al. |
| 2012/0106562 A1 | 5/2012 | Laor et al. |
| 2012/0106567 A1 | 5/2012 | Hanes et al. |
| 2012/0144064 A1 | 6/2012 | Parker et al. |
| 2012/0155256 A1 | 6/2012 | Pope et al. |
| 2012/0155264 A1 | 6/2012 | Sharma et al. |
| 2012/0163396 A1 | 6/2012 | Cheng et al. |
| 2013/0014118 A1 | 1/2013 | Jones |
| 2013/0021354 A1 | 1/2013 | Van Eerd et al. |
| 2013/0039178 A1 | 2/2013 | Chen et al. |
| 2013/0077489 A1 | 3/2013 | Bloch et al. |
| 2013/0212296 A1 | 8/2013 | Goel et al. |
| 2013/0239119 A1 | 9/2013 | Garg et al. |
| 2013/0250757 A1 | 9/2013 | Tabatabaee et al. |
| 2013/0250762 A1 | 9/2013 | Assarpour |
| 2013/0275631 A1 | 10/2013 | Magro et al. |
| 2013/0286834 A1 | 10/2013 | Lee |
| 2013/0305250 A1 | 11/2013 | Durant |
| 2014/0036680 A1 | 2/2014 | Lih et al. |
| 2014/0036930 A1 | 2/2014 | Lih et al. |
| 2014/0095745 A1 | 4/2014 | Kawahara |
| 2014/0133314 A1 | 5/2014 | Mathews et al. |
| 2014/0140206 A1 | 5/2014 | Hendel et al. |
| 2014/0155043 A1 | 6/2014 | Gell et al. |
| 2014/0192646 A1 | 7/2014 | Mir et al. |
| 2014/0204742 A1 | 7/2014 | Pandit |
| 2014/0269274 A1 | 9/2014 | Banavalikar et al. |
| 2014/0269324 A1 | 9/2014 | Tietz et al. |
| 2014/0269711 A1 | 9/2014 | Ravid et al. |
| 2014/0286349 A1 | 9/2014 | Kitada |
| 2014/0289568 A1 | 9/2014 | Koyoma et al. |
| 2014/0310354 A1 | 10/2014 | Fountain et al. |
| 2015/0026309 A1 | 1/2015 | Radcliffe et al. |
| 2015/0026361 A1 | 1/2015 | Matthews et al. |
| 2015/0058857 A1 | 2/2015 | Sandstorm |
| 2015/0095568 A1 | 4/2015 | Lamb et al. |
| 2015/0103667 A1 | 4/2015 | Elias |
| 2015/0124611 A1 | 5/2015 | Attar et al. |
| 2015/0127797 A1 | 5/2015 | Attar et al. |
| 2015/0163146 A1 | 6/2015 | Zhang et al. |
| 2015/0180782 A1 | 6/2015 | Rimmer et al. |
| 2015/0180790 A1 | 6/2015 | Rimmer et al. |
| 2015/0200866 A1 | 7/2015 | Pope et al. |
| 2015/0371607 A1 | 12/2015 | Holland et al. |
| 2015/0381505 A1 | 12/2015 | Sundararaman et al. |
| 2016/0135076 A1 | 5/2016 | Grinshpun et al. |
| 2016/0173383 A1 | 6/2016 | Liu et al. |
| 2016/0191392 A1 | 6/2016 | Liu |
| 2016/0226951 A1 | 8/2016 | Talpey et al. |
| 2016/0294715 A1 | 10/2016 | Raindel et al. |
| 2016/0337257 A1 | 11/2016 | Yifrach et al. |
| 2017/0118108 A1 | 4/2017 | Avci et al. |
| 2017/0142020 A1 | 5/2017 | Sundararaman et al. |
| 2017/0180261 A1 | 6/2017 | Ma et al. |
| 2017/0187641 A1 | 6/2017 | Lundqvist et al. |
| 2017/0295112 A1 | 10/2017 | Cheng et al. |
| 2017/0373989 A1 | 12/2017 | Gafni et al. |
| 2018/0063030 A1 | 3/2018 | Mitulal et al. |
| 2018/0063038 A1 | 3/2018 | Ghanwani et al. |
| 2018/0091388 A1 | 3/2018 | Levy et al. |
| 2018/0115498 A1 | 4/2018 | Sundaram et al. |
| 2018/0205653 A1 | 7/2018 | Wang et al. |
| 2018/0241677 A1 | 8/2018 | Srebro et al. |
| 2018/0278550 A1 | 9/2018 | Rosen et al. |
| 2018/0302328 A1 | 10/2018 | Keith et al. |
| 2019/0042443 A1 | 2/2019 | Maciejewski et al. |
| 2019/0042513 A1 | 2/2019 | Fleming, Jr. et al. |
| 2019/0044874 A1 | 2/2019 | Zhang et al. |
| 2020/0177521 A1 | 6/2020 | Blumrich et al. |
| 2020/0280518 A1 | 9/2020 | Lee et al. |
| 2021/0006502 A1 | 1/2021 | Zhou et al. |
| 2021/0344600 A1 | 11/2021 | Urman et al. |
| 2021/0377074 A1 | 12/2021 | Yoshida et al. |

(56) References Cited

U.S. PATENT DOCUMENTS

| | | |
|---|---|---|
| 2022/0045972 A1 | 2/2022 | Aibester et al. |
| 2022/0231933 A1 | 7/2022 | Mannor et al. |
| 2022/0263776 A1 | 8/2022 | Mula et al. |
| 2023/0022037 A1 | 1/2023 | Aibester et al. |
| 2023/0068902 A1 | 3/2023 | Seely et al. |
| 2023/0120745 A1 | 4/2023 | Aibester et al. |
| 2023/0137826 A1 | 5/2023 | Ajami et al. |
| 2023/0138522 A1 | 5/2023 | Aibester et al. |
| 2024/0073141 A1 | 2/2024 | Aibester et al. |

FOREIGN PATENT DOCUMENTS

| | | |
|---|---|---|
| EP | 1698976 A1 | 9/2006 |
| EP | 1720295 A1 | 11/2006 |
| EP | 2466476 A1 | 6/2012 |
| WO | 03024033 A1 | 3/2003 |
| WO | 2009107089 A2 | 9/2009 |
| WO | 2013136355 A1 | 9/2013 |
| WO | 2013180691 A1 | 12/2013 |
| WO | 2018044426 A1 | 3/2018 |
| WO | 2018106868 A1 | 6/2018 |
| WO | 2019029318 A1 | 2/2019 |

OTHER PUBLICATIONS

Gran et al., "Congestion Management in Lossless Interconnection Networks", Submitted to the Faculty of Mathematics and Natural Sciences at the University of Oslo in partial fulfillment of the requirements for the degree Philosophiae Doctor, pp. 1-156, Sep. 2013.
Pfister et al., "Hot Spot Contention and Combining in Multistage Interconnect Networks", IEEE Transactions on Computers, vol. C-34, pp. 943-948, Oct. 1985.
Zhu et al., "Congestion control for large-scale RDMA deployments", SIGCOMM, ACM, pp. 523-536, Aug. 17-21, 2015.
Cisco Systems, Inc., "Advantage Series White Paper Smart Buffering", pp. 1-16, year 2016.
Hoeiland-Joergensen et al., "The FlowQueue-CoDel Packet Scheduler and Active Queue Management Algorithm", Internet Engineering Task Force (IETF) as draft-ietf-aqm-fq-codel-06, pp. 1-23, Mar. 18, 2016.
Hahne et al., "Dynamic Queue Length Thresholds for Multiple Loss Priorities", IEEE/ACM Transactions on Networking, vol. 10, No. 3, pp. 368-380, Jun. 2002.
Choudhury et al., "Dynamic Queue Length Thresholds for Shared-Memory Packet Switches", IEEE/ACM Transactions Networking, vol. 6, issue 2, pp. 130-140, Apr. 1998.
Huawei Technologies Co., Ltd., Baidu, Inc., "The Lossless Network for Data Centers," Revision 1.0, pp. 1-15, Nov. 7, 2017.
IEEE Standard 802.1Q ™—2005, "IEEE Standard for Local and metropolitan area networks Virtual Bridged Local Area Networks", pp. 1-303, May 19, 2006.
Infiniband TM Architecture, Specification vol. 1, Release 1.2.1, Chapter 12, pp. 657-716, Nov. 2007.
IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for Pause Operation, Annex 31B (MAC Control Pause operation), pp. 763-772, year 2005.
IEEE Std 802.1Qbb., IEEE Standard for Local and metropolitan area networks—"Media Access Control (MAC) Bridges and Virtual Bridged Local Area Networks—Amendment 17: Priority-based Flow Control", pp. 1-40, Sep. 30, 2011.
Cisco Systems, Inc., "Priority Flow Control: Build Reliable Layer 2 Infrastructure", pp. 1-8 pages, year 2015.
Ramakrishnan et al., "The Addition of Explicit Congestion Notification (ECN) to IP", Request for Comments 3168, Network Working Group, pp. 1-63, Sep. 2001.
Infiniband Architecture Release 1.2.1, vol. 1, General specifications, Chapter 7.9, pp. 212-216, Nov. 2007.
Raatikainen, P., "ATM Switches—Switching Technology S38. 3165", Switching Technology, L8-1, pp. 1-34, year 2006 (http://www.netlab.hut.fi/opetus/s383165).
Fahmy, S., "A Survey of ATM Switching Techniques", Department of Computer and Information Science, The Ohio State University, USA, pp. 1-22, Aug. 21, 1995 downloaded from http://www.cs.purdue.edu/homes/fahmy/cis788.08Q/atmswitch.html.
Minkenberg et al., "Multistage Interconnection Networks for Data Centers; Bidirectional Fat Tree Construction and Routing for IEEE 802.1au", IBM Research GmbH, Zurich, Switzerland, pp. 1-9, Jul. 2, 2007.
Bwalya et al., "Performance Evaluation of Buffer Size for Access Networks in First Generation Optical Networks", International Journal of Internet of Things, vol. 6, issue 3, pp. 98-105, year 2017.
"Understanding CoS Priority Group and Queue Guaranteed Minimum Bandwidth," Traffic Management User Guide (QFX Series and EX4600 Switches), juniper.net, pp. 1-4, Feb. 1, 2021, as downloaded from https://www.juniper.net/documentation/us/en/software/junos/traffic-mgmt-qfx/topics/concept/cos-qfx-series-guaranteed-bandwidth-understanding.html.
"QoS Modular Qos Command—Line Interface Configuration Guide, Cisco IOS Xe Fuji 16.8x," Cisco, pp. 1-25, Apr. 20, 2018, as downloaded from https://www.cisco.com/c/en/us/td/docs/ios-xml/ios/qos_mqc/configuration/xe-16-8/qos-mqc-xe-16-8-book/qos-limits-wred.html.
Ramakrishnan et al., "The Addition of Explicit Congestion Notification (ECN) to IP," Request for Comments (RFC) 1 3168, The Internet Society, pp. 1-63, Sep. 2001.
U.S. Appl. No. 17/895,108 Office Action dated Oct. 29, 2024.

ALLOCATION OF SHARED RESERVE MEMORY

CROSS-REFERENCE TO RELATED APPLICATIONS

This application is a continuation of U.S. patent application Ser. No. 17/588,385, filed Jan. 31, 2022, whose disclosure is incorporated herein by reference.

FIELD OF THE INVENTION

The present invention relates generally to network communication, and particularly to management of memory resources in network devices.

BACKGROUND OF THE INVENTION

Some network devices, such as packet switches, use shared memory schemes for efficient storage of packets and other data. For example, U.S. Pat. No. 10,250,530 describes techniques for flexible buffer allocation in a network switch. The patent describes a communication apparatus that includes multiple interfaces configured to be connected to a packet data network for receiving and forwarding of data packets of multiple types. A memory is coupled to the interfaces and configured as a buffer to contain packets received through the ingress interfaces while awaiting transmission to the network via the egress interfaces. Packet processing logic is configured to maintain multiple transmit queues, which are associated with respective ones of the egress interfaces, and to place both first and second queue entries, corresponding to first and second data packets of the first and second types, respectively, in a common transmit queue for transmission through a given egress interface, while allocating respective spaces in the buffer to store the first and second data packets against separate, first and second buffer allocations, which are respectively assigned to the first and second types of the data packets.

SUMMARY OF THE INVENTION

An embodiment of the present invention that is described herein provides a network device including one or more ports, a packet processor, and a memory management circuit. The one or more ports are to communicate packets over a network. The packet processor is to process the packets using a plurality of queues. The memory management circuit is to maintain a shared buffer in a memory and adaptively allocate memory resources from the shared buffer to the queues, to maintain in the memory, in addition to the shared buffer, a shared-reserve memory pool for use by a defined subset of the queues, to identify in the subset a queue that (i) requires additional memory resources, (ii) is not eligible for additional allocation from the shared buffer, and (iii) meets an eligibility condition for the shared-reserve memory pool, and to allocate memory resources to the identified queue from the shared-reserve memory pool.

In an embodiment, the memory management circuit is to identify that the queue requires additional memory resources by receiving a request from the queue. In some embodiments, the memory management circuit is to identify that the queue is not eligible for additional allocation from the shared buffer, by identifying that the occupancy of the queue exceeds a MAX threshold set for the queue. In an example embodiment, the memory management circuit is to verify that the occupancy of the queue meets the eligibility condition for the shared-reserve memory pool, by verifying that the occupancy is no more than a defined margin above the MAX threshold.

In a disclosed embodiment, the memory management circuit is to pre-allocate to the queue a private-reserve memory resource, irrespective of the shared buffer and the shared-reserve memory pool. In an embodiment, the queues in the subset are associated with a same port of the network device.

There is additionally provided, in accordance with an embodiment that is described herein, a memory management circuit in a network device. The memory management circuit includes one or more interfaces and circuitry. The one or more interfaces are to communicate with a plurality of queues of the network device that process packets, and with a memory. The circuitry is to maintain a shared buffer in the memory and adaptively allocate memory resources from the shared buffer to the queues, to maintain in the memory, in addition to the shared buffer, a shared-reserve memory pool for use by a defined subset of the queues, to identify in the subset a queue that (i) requires additional memory resources, (ii) is not eligible for additional allocation from the shared buffer, and (iii) meets an eligibility condition for the shared-reserve memory pool, and to allocate memory resources to the identified queue from the shared-reserve memory pool.

There is also provided, in accordance with an embodiment that is described herein, a method for communication in a network device. The method includes communicating packets over a network, and processing the packets using a plurality of queues. A shared buffer is maintained in a memory, and memory resources are allocated adaptively from the shared buffer to the queues. In addition to the shared buffer, a shared-reserve memory pool is maintained in the memory for use by a defined subset of the queues. A queue that (i) requires additional memory resources, (ii) is not eligible for additional allocation from the shared buffer, and (iii) meets an eligibility condition for the shared-reserve memory pool, is identified in the subset. Memory resources are allocated to the identified queue from the shared-reserve memory pool.

There is further provided, in accordance with an embodiment that is described herein, a method for memory management in a network device. The method includes communicating with a plurality of queues of the network device that process packets, and with a memory. A shared buffer is maintained in a memory, and memory resources are allocated adaptively from the shared buffer to the queues. In addition to the shared buffer, a shared-reserve memory pool is maintained in the memory for use by a defined subset of the queues. A queue that (i) requires additional memory resources, (ii) is not eligible for additional allocation from the shared buffer, and (iii) meets an eligibility condition for the shared-reserve memory pool, is identified in the subset. Memory resources are allocated to the identified queue from the shared-reserve memory pool.

There is additionally provided, in accordance with an embodiment that is described herein, a method for memory management in a network device that processes packets using queues. The method includes maintaining in a memory (i) a shared buffer and (ii) shared-reserve memory pool. A queue that (i) requires additional memory resources, (ii) is not eligible for additional allocation from the shared buffer, and (iii) is eligible for allocation from the shared-reserve memory pool, is identified. Memory resources are allocated to the identified queue from the shared-reserve memory pool.

The present invention will be more fully understood from the following detailed description of the embodiments thereof, taken together with the drawings in which:

DETAILED DESCRIPTION OF EMBODIMENTS

Overview

Figure 1:
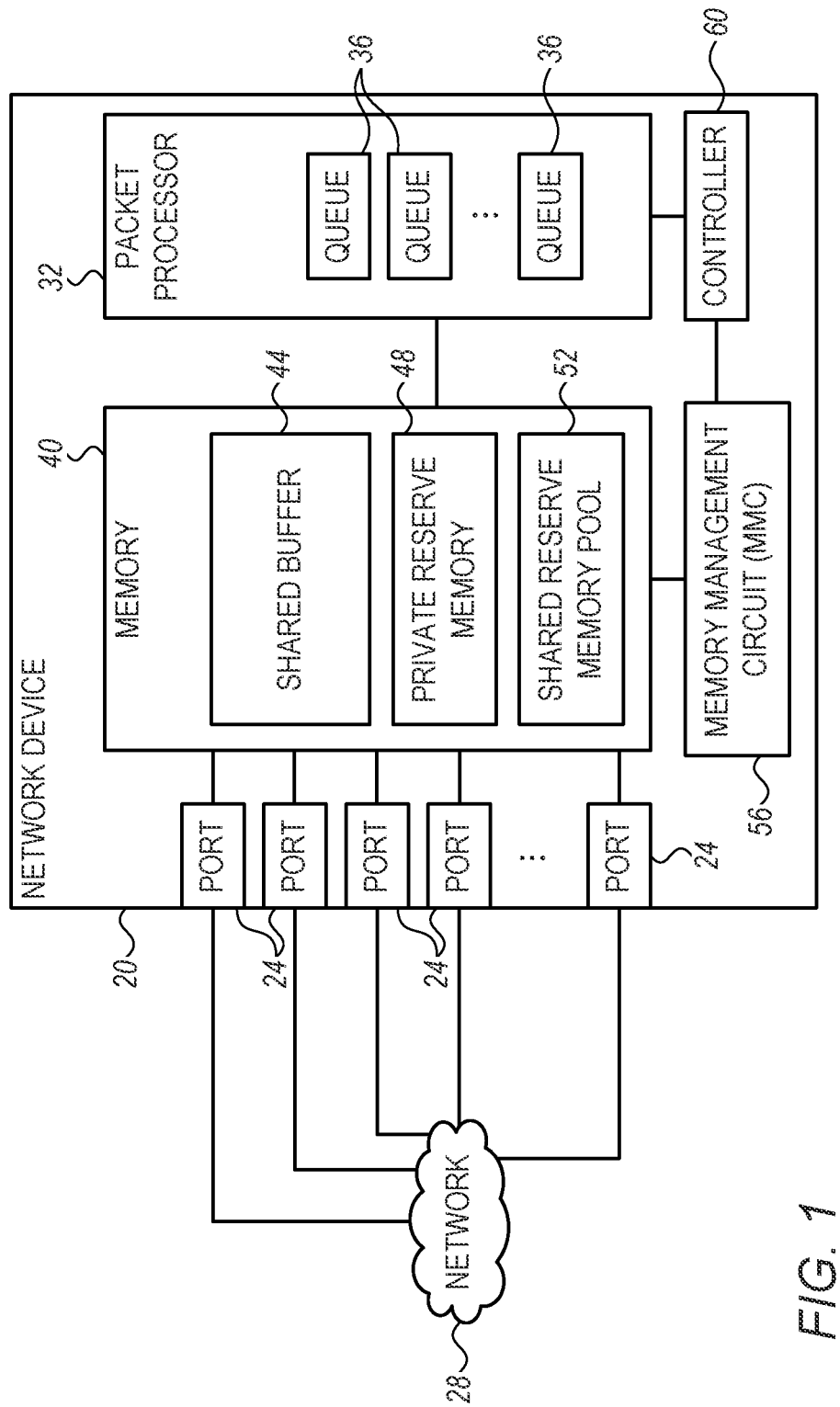
FIG. 1 is a block diagram that schematically illustrates a network device comprising a shared buffer, a private reserve memory and a shared reserve memory pool, in accordance with an embodiment of the present invention.

Embodiments of the present invention that are described herein provide improved methods and apparatus for allocating memory resources to queues in network devices, e.g., in packet switches.

In some embodiments, a network device comprises one or more ports for sending and receiving packets over a network, and a packet processor that processes the packets. As part of the packet processing, the packet processor queues the packets in a plurality of queues. In a typical implementation, a given port is assigned separate receive and transmit queues. The packets of a given direction (receive or transmit) are queued in separate queues according to their priority group. Typically, the packet data is stored in a memory, and the queues store descriptors or pointers that point to the data.

In real-life network devices, traffic load may vary significantly from one port to another and/or over time. Consequently, the memory requirements of the queues are typically highly variable, as well. Since the overall memory resources of the network device are limited, memory allocation to the queues has to be fast, flexible and efficient in order to maintain high throughput and avoiding congestion. In some embodiments of the present invention, the network device comprises a Memory Management Circuit (MMC) that manages the memory resources of the network device, including allocating suitable memory resources to the various queues.

In some embodiments, the MMC maintains three different types of memory regions in the memory, referred to as a shared buffer, a private reserve memory and a shared reserve memory pool. The MMC allocates memory resources from the three regions to the queues according to criteria that are described herein.

Resources of the private reserve memory are typically allocated a-priori to the queues, and remain allocated to the same queues regardless of actual queue occupancies. Such a-priori, static allocation enables the queues to respond immediately to fast-developing traffic bursts.

Memory resources of the shared buffer are typically allocated to the queues adaptively, depending on individual queue occupancy. Typically, a highly active and full queue will be allocated more memory from shared buffer 44, whereas an idle queue will receive little or no shared-buffer allocation. A queue will typically begin requesting allocation from the shared buffer after it has exhausted its pre-allocated private-reserve allocation. The shared buffer allocation mechanism maintains fairness among the active queues.

In some embodiments, the MMC defines a maximal occupancy (referred to herein as a "MAX-STATE" threshold), above which a queue is not eligible to receive additional allocations from the shared buffer. The MAX-STATE threshold is adaptive and depends on the overall demand for shared-buffer resources. When the overall demand for shared-buffer resources is high, e.g., when some queues experience congestion, the MMC will reduce the MAX-STATE threshold. When the overall demand for shared-buffer resources is low, the MMC will increase the MAX-STATE threshold. This mechanism introduces a certain degree of fairness among the queues in competing for shared buffer resources.

In practice, the above-described allocation scheme may be problematic in some scenarios. Consider, for example, a scenario in which one queue has a relatively low activity level and small occupancy, while other queues are highly active and full. With the above-described allocation schemes, the large and busy queues will receive large allocations from the shared buffer, and will cause the MMC to reduce the MAX-STATE threshold. As a result, the low-activity queue may become ineligible for shared-buffer allocation. In such a situation, the low-activity queue may not cope well with bursts of packets, e.g., may become congested or drop packets.

As seen in this example, a low-activity queue may suffer from the fact that higher-activity queues dominate the shared-buffer allocations. This scenario is especially problematic because a low-activity queue will also typically receive a small private-reserve allocation to begin with.

In some embodiments the MMC avoids the above-described scenario, and possibly other problematic scenarios, using the resources of the shared reserve memory pool. In these embodiments, the MMC defines an additional range of occupancy levels, above the MAX-STATE threshold, in which a queue is eligible for allocation from the shared reserve memory pool. In an embodiment, the MMC identifies a queue that requires additional memory but is too full to be eligible for allocation from the shared buffer (i.e., a queue whose occupancy exceeds the MAX-STATE threshold). If the occupancy level of the queue is not too high above the MAX-STATE threshold (e.g., up to a predefined margin above the MAX-SATATE threshold), the MMC allocates to the queue additional memory from the shared reserve memory pool. The shared-reserve mechanism thus ensures that a small and relatively idle queue will not be starved of memory resources due to high demand from other queues.

In some embodiments, the MMC maintains multiple separate shared reserve memory pools for multiple respective subsets of queues. For example, the MMC may maintain a shared reserve memory pool for the queues of a respective port.

Several example implementations of the disclosed memory allocation scheme are described herein.

System Description

FIG. 1 is a block diagram that schematically illustrates a network device 20, in accordance with an embodiment of the present invention. Network device 20 may comprise, for example, a switch, a router, a network adapter such as a Network Interface Controller (NIC), or any other suitable network device that processes packets. The description that follows will refer mainly to a packet switch, by way of example.

Network device 20 comprises one or more ports 24 for receiving packets from a packet network 28 and/or for transmitting packets to network 28. A switch or router typically comprises a plurality of ports 24. A network adapter may comprise a single port 24 or multiple ports 24. Network 28 and network device 20 may operate in accordance with any suitable network communication protocol, such as, for example, Ethernet, InfiniBand™ or the Nvidia forwarding protocol ("NVL").

Network device 20 further comprises a packet processor 32, which processes the packets that are received and transmitted via ports 24. In a switch, for example, packet processor 32 forwards each incoming packet to a suitable port for transmission.

As part of the processing of packets, packet processor 32 queues the packets in multiple queues 36. In practice, queues 36 typically do not store the actual packet data, but rather descriptors, pointers or other metadata that points to the packets. For clarity, queuing of this sort is also referred to herein as "queuing the packets." In an example embodiment, for a given port 24, separate queues are designated for reception ("ingress") and for transmission ("egress"). For a given direction (transmission or reception), separate queues are designated for different priority groups being used.

Network device 20 further comprises a memory 40 that stores, inter alia, the packet data including headers and/or payloads. Resources of memory 40 can be allocated to the various queues 36 for storage of packets. Three separate memory regions are defined in memory 40, namely a shared buffer 44, a private reserve memory 48 and a shared reserve memory pool 52. In alternative embodiments, at least some of the regions of memory 40 (e.g., shared buffer 44) may reside externally to the network device.

Memory 40 is managed by a Memory Management Circuit (MMC) 56. Among other tasks, MMC 56 defines shared buffer 44, private reserve memory 48 and shared reserve memory pool 52, and allocates memory resources from the various memory regions to queues 36. Example allocation schemes are described in detail below. MMC 56 typically comprises one or more interfaces for communicating with queues 36 and with memory 40, and circuitry for performing the memory allocation tasks described herein.

Network device 20 further comprises a controller 60, which performs various control-plane and management tasks.

The configurations of network device 20 and its various components, such as packet processor 32, MMC 56 and memory 40, are example configurations that are chosen purely for the sake of conceptual clarity. Any other suitable configurations can be used in alternative embodiments. In various embodiments, network device 20 and its various components can be implemented using hardware, e.g., using one or more Application-Specific Integrated Circuits (ASIC) and/or Field-Programmable Gate Arrays (FPGA), using software, or using a combination of hardware and software components. Memory 40 typically comprises a suitable Random-Access Memory (RAM).

In some embodiments, certain components of network device 20, e.g., controller 60 and possibly some of functions of MMC 56, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Memory Allocation Using Shared Buffer, Private Reserve Memory and Shared Reserve Memory In some embodiments of the present invention, Memory Management Circuit (MMC) 56 allocates memory resources to the various queues 36 from (i) shared buffer 44, (ii) private reserve memory 48 and (iii) shared reserve memory pool 52. Each of these memory regions has its own characteristics. MMC 53 allocates the resources of each region in accordance with different criteria.

Memory resources of private reserve memory 48 are typically allocated by MMC 56 a-priori to queues 36 (or to at least some of queues 36). The private-reserve memory typically remains allocated to the same queues regardless of actual queue occupancies. This allocation allows queues 36 to respond immediately to traffic bursts and maintain forward progress, even in a congested device. The size of the private-reserve allocation may differ from one queue to another. Further aspects of using a private reserve memory are addressed, for example, in U.S. patent application Ser. No. 17/503,383, entitled "Dynamic Reserve Allocation on Shared-Buffer," filed Oct. 18, 2021.

Memory resources of shared buffer 44 are typically allocated by MMC 56 adaptively, depending on individual queue occupancy. Typically, a highly active and full queue 36 will be allocated more memory from shared buffer 44, whereas an idle queue will receive little or no shared-buffer allocation. Aspects of shared-buffer allocation are addressed, for example, in U.S. Pat. No. 10,250,530, cited above. A queue will typically begin requesting allocation from shared buffer 44 after it has exhausted its private-reserve allocation (that was pre-allocated from private reserve memory 48).

In some embodiments, MMC 56 defines a maximal occupancy (referred to herein as a "MAX-STATE" threshold), above which a queue 36 is not eligible to receive additional allocations from shared buffer 44. Unless assisted by the disclosed technique, a queue that is ineligible to receive additional allocations from the shared buffer may drop packets (in lossy traffic implementations) or make excessive use of flow control (e.g., credits, in lossless traffic implementations).

The MAX-STATE threshold is adaptive and depends on the overall demand for shared-buffer resources. When the overall demand for shared-buffer resources is high, e.g., when some queues experience congestion, MMC 56 will typically reduce the MAX-STATE threshold. When the overall demand for shared-buffer resources is low, MMC 56 will typically increase the MAX-STATE threshold. This mechanism introduces a certain degree of fairness among the queues in competing for the resources of shared buffer 44.

As explained above, the allocation schemes that use the shared buffer and private reserve memory may be problematic in some scenarios. For example, due to the adaptation of the MAX-STATE threshold, a low-activity queue may become ineligible for shared-buffer allocation when high-activity queues have high demand for memory.

In some embodiments, MMC 56 uses the resources of shared reserve memory pool 52 to avoid such problematic scenarios. In these embodiments, MMC 56 defines an additional range of occupancy levels, above the MAX-STATE threshold, in which a queue is eligible for allocation from shared reserve memory pool 52. The various occupancy thresholds and ranges are depicted in FIG. 2 below.

In an embodiment, MMC 56 identifies a queue 36 that requires additional memory but is too full to be eligible for allocation from shared buffer 44 (i.e., a queue whose occupancy exceeds the MAX-STATE threshold). If the occupancy level of the queue is not too high above the MAX-STATE threshold (e.g., up to a predefined margin above the MAX-SATATE threshold), MMC 52 allocates to the queue memory resources from shared reserve memory pool 52.

Figure 2:
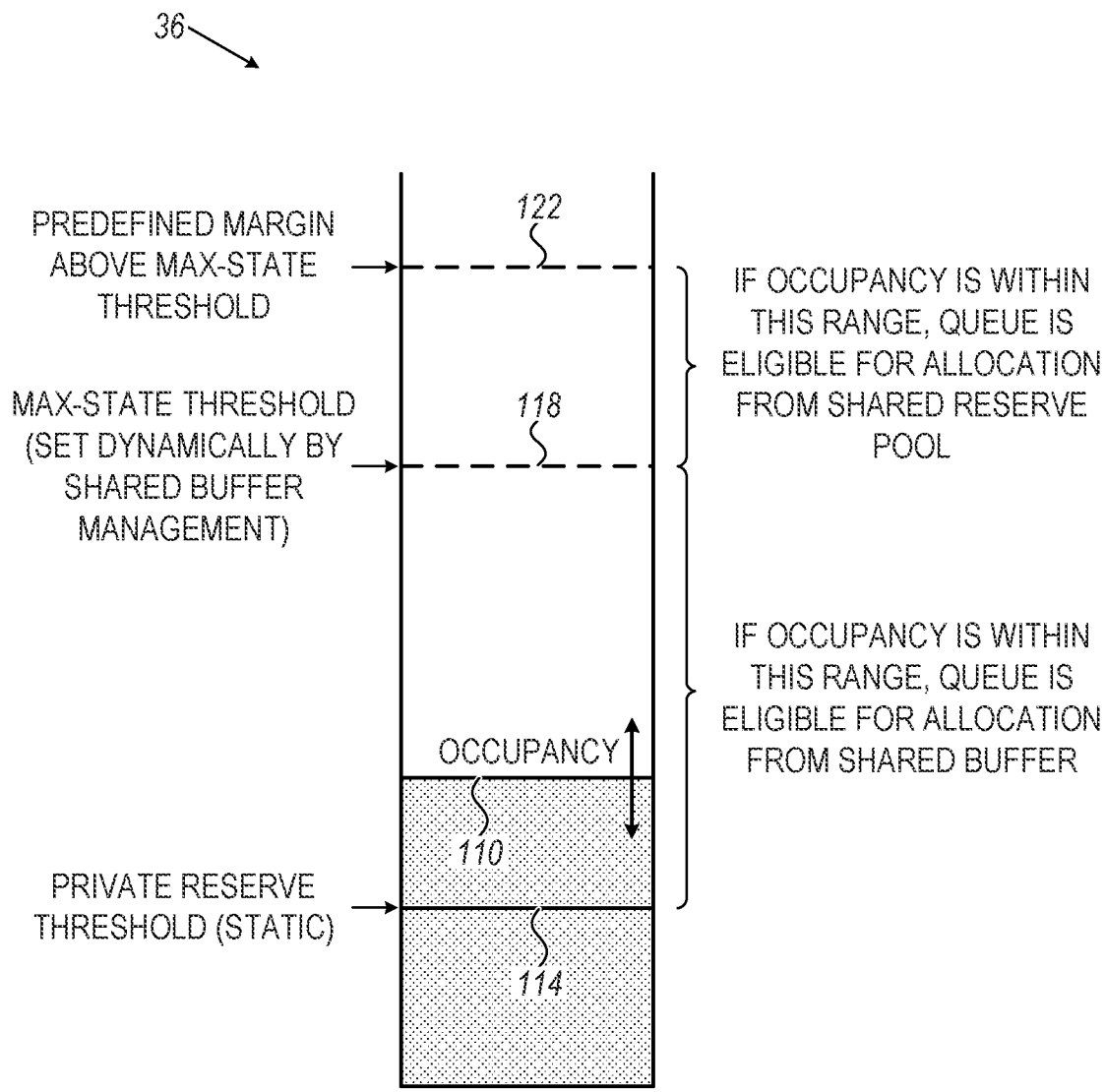
FIG. 2 is a diagram that schematically illustrates occupancy thresholds and ranges used for allocating memory resources to a queue in the network device of FIG. 1, in accordance with an embodiment of the present invention.

FIG. 2 is a diagram that schematically illustrates occupancy thresholds and ranges used for allocating memory resources to a queue 36, in accordance with an embodiment of the present invention. The queue in the figure may be any of queues 36 in network device 20 of FIG. 1 above.

The occupancy of queue 36 is variable and depends on its rate of filling and rate of emptying. At a given time, queue 36 has a current occupancy level denoted 110. The private reserve allocation assigned to queue 36 is marked by a private reserve threshold 114. This level is static, i.e., does not vary depending on the actual occupancy level of the queue.

The current level of the MAX-STATE threshold is denoted 118 in the figure. As explained above, MAX-STATE threshold 118 is varied by MMC 56 depending on the overall demand for allocations from shared buffer 44. When demand is high, MMC 56 decreases MAX-STATE threshold 118, and vice versa. In a typical implementation, the MMC calculates the MAX-STATE threshold for a certain queue based on (i) the total free memory space remaining in the shared buffer and (ii) the number of queues assigned to the shared buffer pool. Thus, as the free memory space in the shared buffer decreases, the potential additional memory that can be allocated to a given queue decreases, as well.

When occupancy level 110 of queue 36 is in the range between private reserve threshold 114 and MAX-STATE threshold 118, queue 36 is eligible to receive additional allocations from shared buffer 44. (When occupancy level 110 is below this range, the queue will still have available resources from its private-reserve allocation. When occupancy level 110 is above this range, the shared-buffer management scheme will prevent allocating additional memory from the shared buffer to the queue.)

A predefined margin 122 is set by MMC 56 as an upper limit for eligibility for allocation from shared reserve memory pool 52. In other words, the range between levels 118 and 122 is predefined, and this constant-size range moves up and down following the variations of MAX-STATE threshold 118. When occupancy level 110 of queue 36 is in this range (between MAX-STATE threshold 118 and margin 122), queue 36 is eligible to receive additional allocations from shared reserve memory pool 52. (When occupancy level 110 is below this range, the queue may request allocations from shared buffer 44. When occupancy level 110 is above this range, the queue is not eligible to any additional allocations, from any source.)

Figure 3:
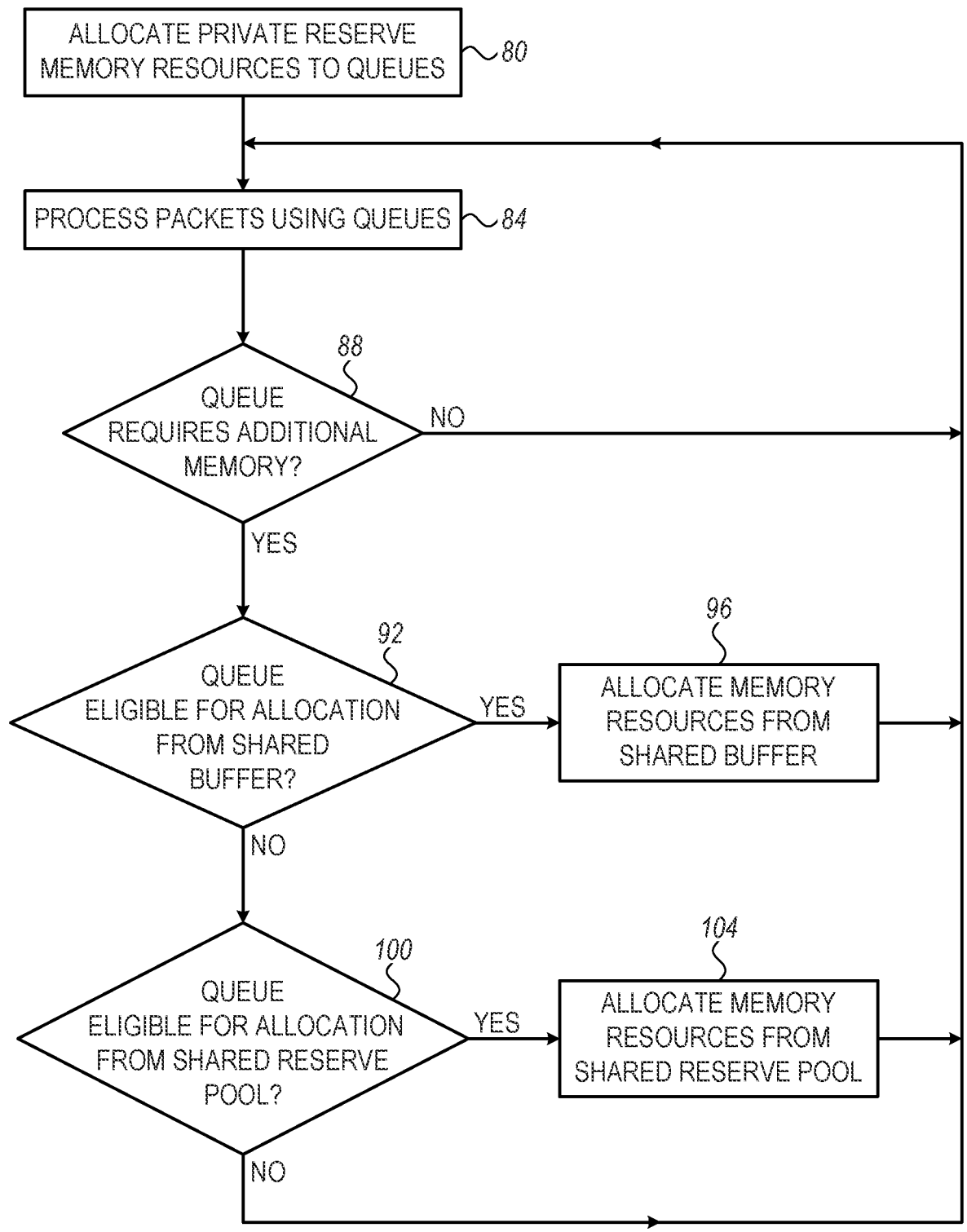
FIG. 3 is a flow chart that schematically illustrates a method for allocating memory resources to queues in the network device of FIG. 1, in accordance with an embodiment of the present invention.

FIG. 3 is a flow chart that schematically illustrates a method, carried out by MMC 56 in network device 20, for allocating memory resources to queues 36, in accordance with an embodiment of the present invention.

The method begins with MMC 56 pre-allocating memory resources of private reserve memory 48 to queues 36, at a private reserve allocation stage 80. At a packet processing stage 84, packet processor 32 receives packets from network 28 via ports 24, processes the packets including queuing them in queues 36, and sends the processed packets back via ports 24 to network 28. At this stage, MMC 56 also performs accounting on the various queues with respect to the shared buffer.

At a requirement checking stage 88, MMC 56 checks whether any of queues 36 requires additional memory resources. In an embodiment, a queue that requires additional memory will send a suitable request to MMC 56. Thus, MMC may identify that a queue requires additional memory by identifying a request from the queue. Alternatively, MMC 56 may proactively determine that a queue requires additional memory, using any suitable method. If no queue requires additional memory (i.e., if all queues have sufficient free memory in their pre-allocated private-reserve allocations), the method loops back to packet processing stage 84.

In response to identifying that a certain queue requires additional memory, MMC 56 checks whether the queue is eligible for allocation from shared buffer 44, at a shared-buffer eligibility checking stage 92. In an embodiment, MMC checks whether the current occupancy (110) of the queue is (i) higher than private-reserve threshold 114 and (ii) lower than MAX-STATE threshold 118. If so, MMC allocates memory resources from shared buffer 44 to the queue, at a shared-buffer allocation stage 96. The method then loops back to packet processing stage 84.

If the outcome of stage 92 is that the queue is not eligible for allocation from shared buffer 44, MMC 56 checks whether the queue is eligible for allocation from shared reserve memory pool 52, at a shared-reserve eligibility checking stage 100. In an embodiment, MMC checks whether the current occupancy (110) of the queue is (i) higher than MAX-STATE threshold 118 and (ii) lower than margin 122. If so, MMC allocates memory from shared reserve memory pool 52 to the queue, at a shared-reserve allocation stage 104. The method then loops back to packet processing stage 84.

If the outcome of stage 100 is that the queue is not eligible for allocation from shared reserve memory pool 52, the method loops back to packet processing stage 84 without allocating any additional memory to the queue.

The method flow of FIG. 3 is an example flow that is depicted purely for the sake of conceptual clarity. In alternative embodiments, the disclosed techniques can be implemented using any other suitable flow.

For example, the method can be divided into two separate processes that are executed in parallel. One process is a shared-buffer management process, which allocates memory from shared buffer 44 and adapts MAX-STATE threshold 118. The other process is a shared-reserve management process, which allocates memory from shared reserve memory pool 52. The variations in MAX-STATE threshold 118 affect both processes, since they affect both eligibility ranges (eligibility for shared-buffer allocation, and eligibility for shared-reserve allocation). As another example, the method can be used with a shared-buffer mechanism that uses a static (i.e., non-variable) MAX-STATE threshold.

As yet another example, MMC 56 may define a hierarchy of shared-reserve memory pools 52. The hierarchy may comprise, for example, a "global" shared-reserve pool, plus shard-reserve pools for receive (ingress) queues, for multicast (MC) queues, for transmit (egress) queues, and the like. When a certain shared-reserve pool is exhausted, the MMC may allocate additional memory to this pool from the global shared-reserve pool.

The description up to this point referred to a single shared reserve memory pool 52, whose resources may be allocated to any of queues 36 in network device 20. In some embodiments, MMC 56 maintains multiple separate shared reserve memory pools 52 in memory 40. Each shared reserve memory pool 52 is assigned to a respective subset of queues 36. In other words, in these embodiments MMC 56 allocates to a given queue only shared-reserve allocations from the pool 52 of the subset of queues to which the given queue belongs. For example, MMC 52 may maintain a separate pool 52 for the receive queues of each port 48, and/or to the transmit queues of each port. In an example embodiment, a given port 24 is assigned a set of queues 36 corresponding to respective priority groups, and MMC 56 maintains a shared reserve memory pool 52 for this set of queues. As another example, MMC 52 may maintain a separate pool 52 for any other group of (receive or transmit) queues.

In an example embodiment, MMC 56 carries out the disclosed technique by executing the pseudo-code sections below. The present example considers a receive queue Rq[ ] of a certain port 24. Several priority groups pg[ ] are defined for this receive queue, and each priority group is assigned a separate queue 36. These queues are thus denoted Rq[ ],pg[ ].

Attributes denoted Rq[ ].SharedReserve and Rq[ ].SharedReserveTH are defined for Rq[ ]. Rq[ ].SharedReserve is the overall size of the allocation from shared reserve memory pool 52, allocated to the various queues 36 belonging to Rq[ ]. Rq[ ].SharedReserveTH denotes the size of the shared reserve pool. In addition, attributes denoted Rq.Pg[ ].PrivateReserve, Rq.Pg[ ].PrivateReserveTH and Rq.Pg[ ].ReserveEligibleTH are defined for each priority group Pg[ ] of receive queue Rq[ ]. Rq.Pg[ ].PrivateReserve is the size of the private-reserve allocation that was allocated to queue Rq.Pg[ ]. Rq.Pg[ ].PrivateReserveTH denotes the upper threshold for allocating memory to the queue from the private reserve pool. Rq.Pg[ ].ReserveEligibleTH denotes the margin (range) above the MAX-TH threshold within which the queue is eligible for allocation from the shared reserve pool.

In this example, the allocation process is performed in accordance with the following pseudo-code:
1. If Inc. & Rq.pg[ ].Occupancy<PrivateReserve[ ]→Done, HaveReserve for Rq.Pg[ ]
2. If Inc. & (Rq.Pg[ ].PrivateReserveTH[ ]<(Rq.pg[ ].Occupancy)<(Rq.Pg[ ].PrivateReserveTH[ ]+Rq.Pg[ ].ReserveEligibleTH)&(Published Rq.pg[ ].AboveMax)
   a. If Rq[ ].SharedReserve<Rq[ ].SharedReserveTH
      i. Increase Rq[ ].SharedReserve by Delta
      ii. Increase Rq.Pg[ ].PrivateReserve[ ] by Delta
   b. If Rq[ ].SharedReserve>Rq[ ].SharedReserveTH→Done, NoReserve for Rq.Pg[ ]
3. If Dec. & Rq.pg[ ] & (Rq.Pg[ ].PrivateReserve[ ]>Rq.Pg[ ].PrivateReserveTH[ ])
   a. Decrease Rq.Pp[ ].PrivateReserve[ ] by Delta
   b. Decrease Rq[ ].SharedReserve by Delta In parallel, an additional "crawler process" is performed according to the following pseudo-code:
4. If (~Rq.pg[ ].AboveMax) & (Rq.Pg[ ].PrivateReserve[ ]>Rq.Pg[ ].PrivateReserveTH[ ])
   a. Decrease Rq.Pp[ ].PrivateReserve[ ] by Delta
   b. Decrease Rq[ ].SharedReserve by Delta In the pseudo-code above, Rq.pg[ ].Occupancy denotes the current occupancy (110) of the queue Rq.pg[ ], Inc. denotes a detected increase in the current occupancy, and Dec. denotes a detected decrease in the current queue occupancy. HaveReserve for Rq.Pg[ ] is an outcome indicating that the queue currently has sufficient reserve memory, whereas NoReserve for Rq.Pg[ ] is an outcome indicating that the queue does not have sufficient reserve memory.

Published Rq.pg[ ].AboveMax is a Boolean attribute that indicates whether the current occupancy of queue Rq.pg[ ] is above MAX-STATE threshold 118. Delta denotes the increment by which MMC 56 increases or decreases the reserve allocations.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A device, comprising:
   one or more ports, to communicate packets over a network;
   a packet processor, to process the packets using a plurality of queues; and
   a memory management circuit, to:
      maintain a shared buffer in a memory, and adaptively allocate memory resources from the shared buffer to the queues;
      maintain in the memory, in addition to the shared buffer, a shared-reserve memory pool for use by one or more of the queues;
      identify, among the queues, a queue that requires additional memory resources, the queue having an occupancy that is:
         (i) above a current value of a dynamic threshold, rendering the queue ineligible for additional allocation from the shared buffer, and
         (ii) no more than a defined margin above the current value of the dynamic threshold, rendering the queue eligible for allocation from the shared-reserve memory pool; and
      allocate memory resources to the identified queue from the shared-reserve memory pool.

2. The device according to claim 1, wherein the memory management circuit is to identify that the queue requires additional memory resources by receiving a request from the queue.

3. The device according to claim 1, wherein the memory management circuit is to pre-allocate to the queue a private-reserve memory resource, irrespective of the shared buffer and the shared-reserve memory pool.

4. The device according to claim 1, wherein the queues are associated with a same port of the network device.

5. A memory management circuit, comprising:
   one or more interfaces, to communicate with a plurality of queues of the network device that process packets, and with a memory; and
   circuitry, to:
      maintain a shared buffer in the memory, and adaptively allocate memory resources from the shared buffer to the queues;

maintain in the memory, in addition to the shared buffer, a shared-reserve memory pool for use by one or more of the queues;

identify, among the queues, a queue that requires additional memory resources, the queue having an occupancy that is:
  (i) above a current value of a dynamic threshold, rendering the queue ineligible for additional allocation from the shared buffer, and
  (ii) no more than a defined margin above the current value of the dynamic threshold, rendering the queue eligible for allocation from the shared-reserve memory pool; and allocate memory resources to the identified queue from the shared-reserve memory pool.

6. The memory management circuit according to claim 5, wherein the circuitry is to identify that the queue requires additional memory resources by receiving a request from the queue.

7. The memory management circuit according to claim 5, wherein the circuitry is to pre-allocate to the queue a private-reserve memory resource, irrespective of the shared buffer and the shared-reserve memory pool.

8. The memory management circuit according to claim 5, wherein the queues are associated with a same port of the network device.

9. A method for communication, the method comprising:
  communicating packets over a network, and processing the packets using a plurality of queues;
  maintaining a shared buffer in a memory, and adaptively allocating memory resources from the shared buffer to the queues;
  maintaining in the memory, in addition to the shared buffer, a shared-reserve memory pool for use by one or more of the queues;
  identifying, among the queues, a queue that requires additional memory resources, the queue having an occupancy that is:
    (i) above a current value of a dynamic threshold, rendering the queue ineligible for additional allocation from the shared buffer, and
    (ii) no more than a defined margin above the current value of the dynamic threshold, rendering the queue eligible for allocation from the shared-reserve memory pool; and
  allocating memory resources to the identified queue from the shared-reserve memory pool.

10. The method according to claim 9, wherein identifying that the queue requires additional memory resources comprises receiving a request from the queue.

11. The method according to claim 9, wherein further comprising pre-allocate to the queue a private-reserve memory resource, irrespective of the shared buffer and the shared-reserve memory pool.

12. The method according to claim 9, wherein the queues in the subset are associated with a same port of the network device.

13. A method for memory management, the method comprising:
  communicating with a plurality of queues of the network device that process packets, and with a memory;
  maintaining a shared buffer in the memory, and adaptively allocating memory resources from the shared buffer to the queues;
  maintaining in the memory, in addition to the shared buffer, a shared-reserve memory pool for use by one or more of the queues;
  identifying, among the queues, a queue that requires additional memory resources, the queue having an occupancy that is:
    (i) above a current value of a dynamic threshold, rendering the queue ineligible for additional allocation from the shared buffer, and
    (ii) no more than a defined margin above the current value of the dynamic threshold, rendering the queue eligible for allocation from the shared-reserve memory pool; and
  allocating memory resources to the identified queue from the shared-reserve memory pool.

14. A method for memory management using queues, the method comprising:
  maintaining in a memory (i) a shared buffer and (ii) a shared-reserve memory pool;
  identifying a queue that requires additional memory resources and has an occupancy that is:
    (i) above a current value of a dynamic threshold, rendering the queue ineligible for additional allocation from the shared buffer, and
    (ii) no more than a defined margin above the current value of the dynamic threshold, rendering the queue eligible for allocation from the shared-reserve memory pool; and
  allocating memory resources to the identified queue from the shared-reserve memory pool.

* * * * *